Sept. 13, 1966    W. R. LEOPOLD, JR., ETAL    3,272,211
MAIN AND SERVICE LINE CONNECTION EMBODYING A SELF-TAPPING
NIPPLE AND AN EXCESSIVE-FLOW SAFETY VALVE-METHOD
AND APPARATUS
Filed Sept. 10, 1962                          4 Sheets-Sheet 1
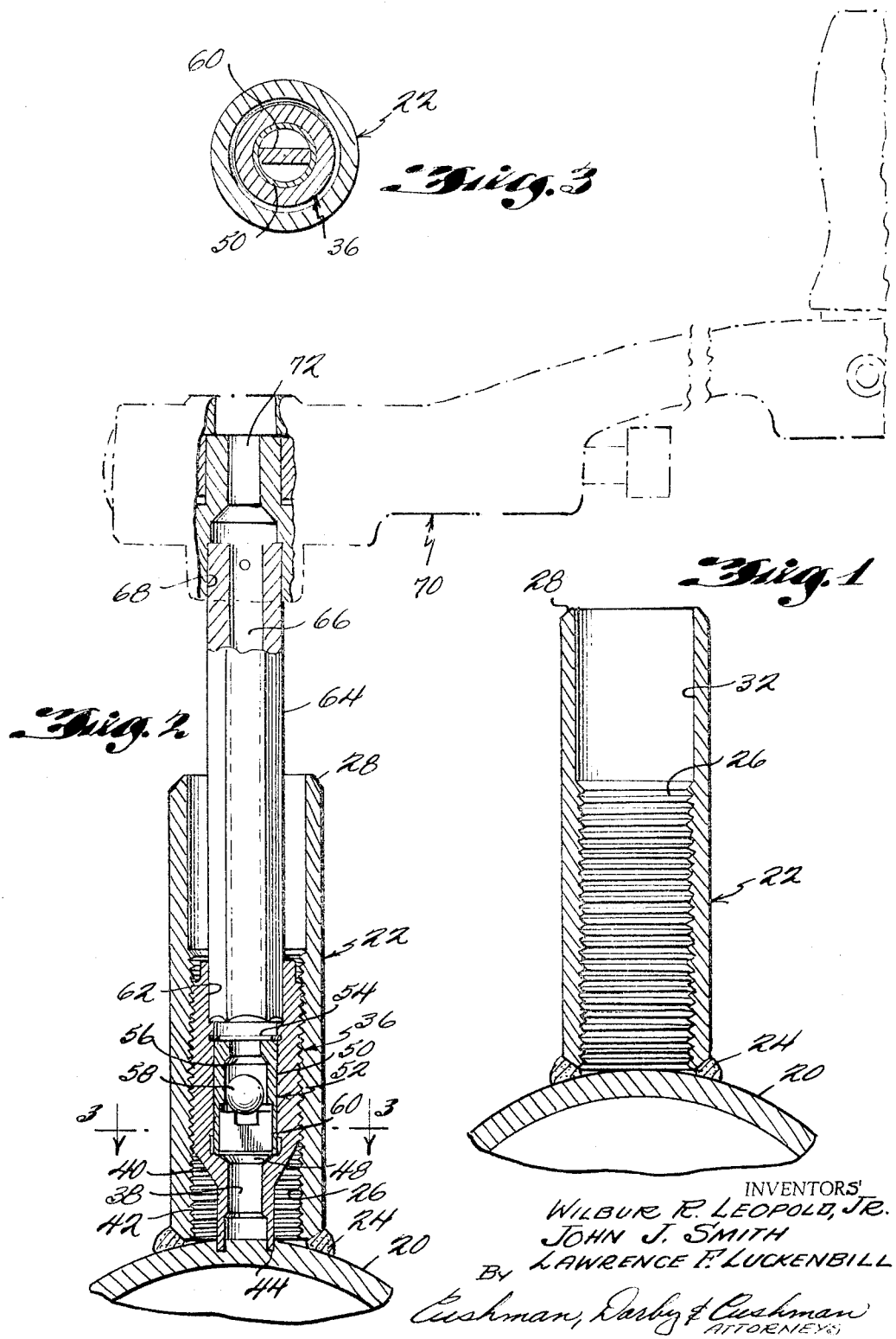
INVENTORS
WILBUR R. LEOPOLD, JR.
JOHN J. SMITH
LAWRENCE F. LUCKENBILL
BY Cushman, Darby & Cushman
ATTORNEYS

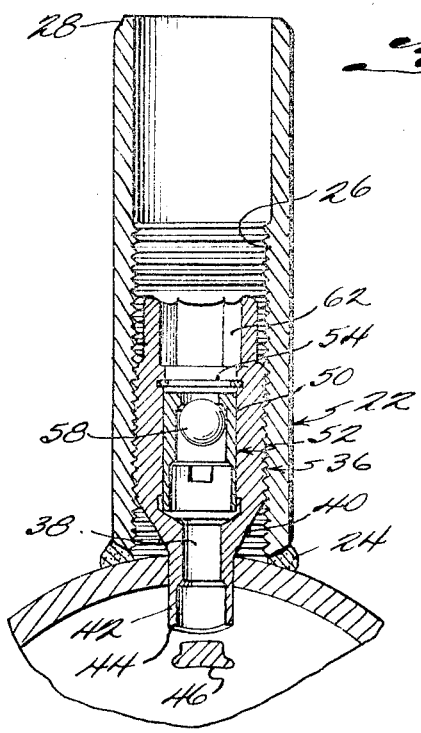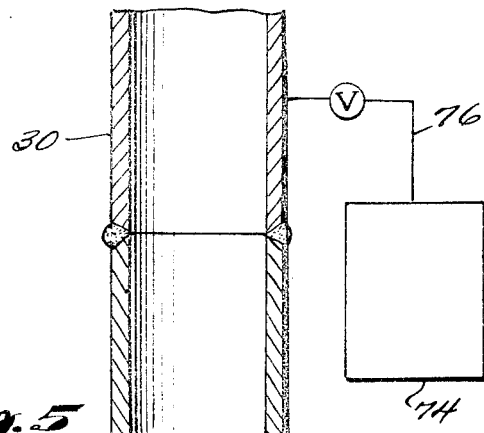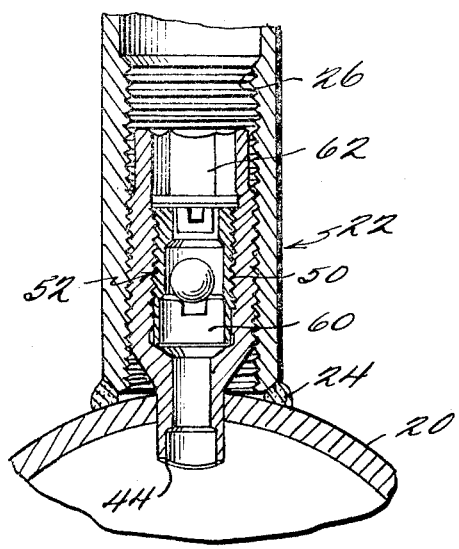

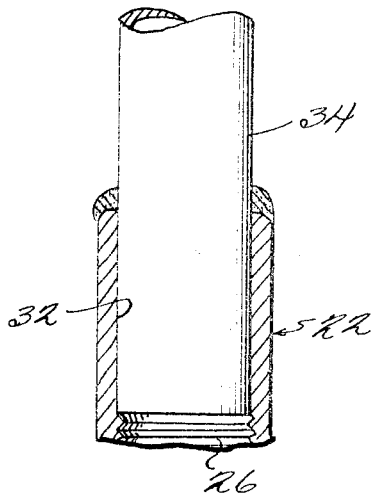
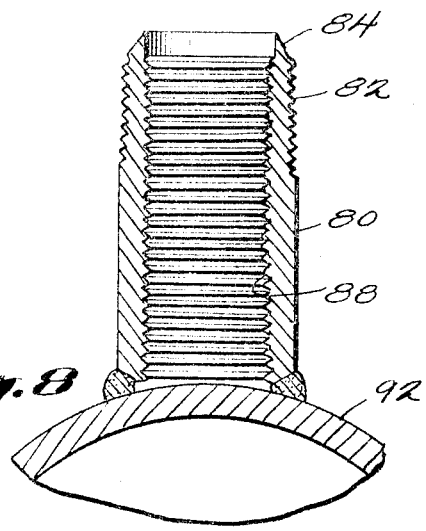
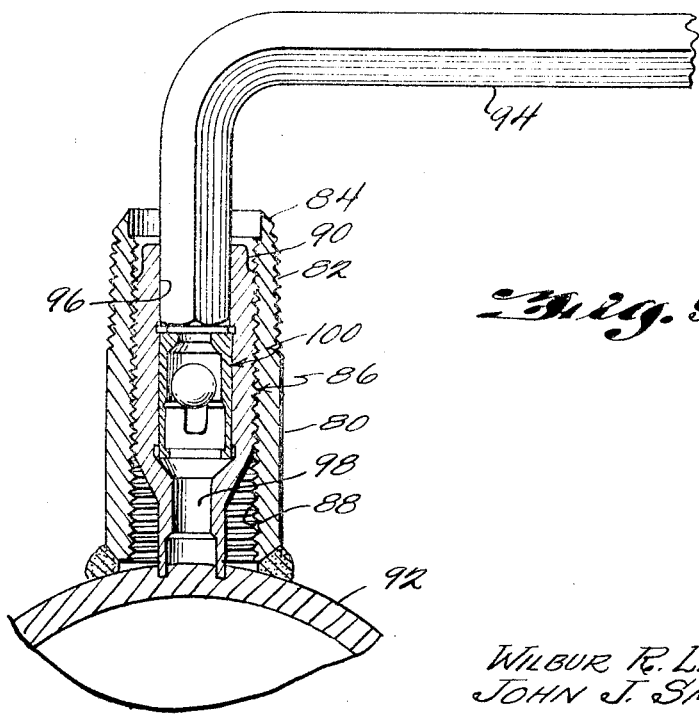

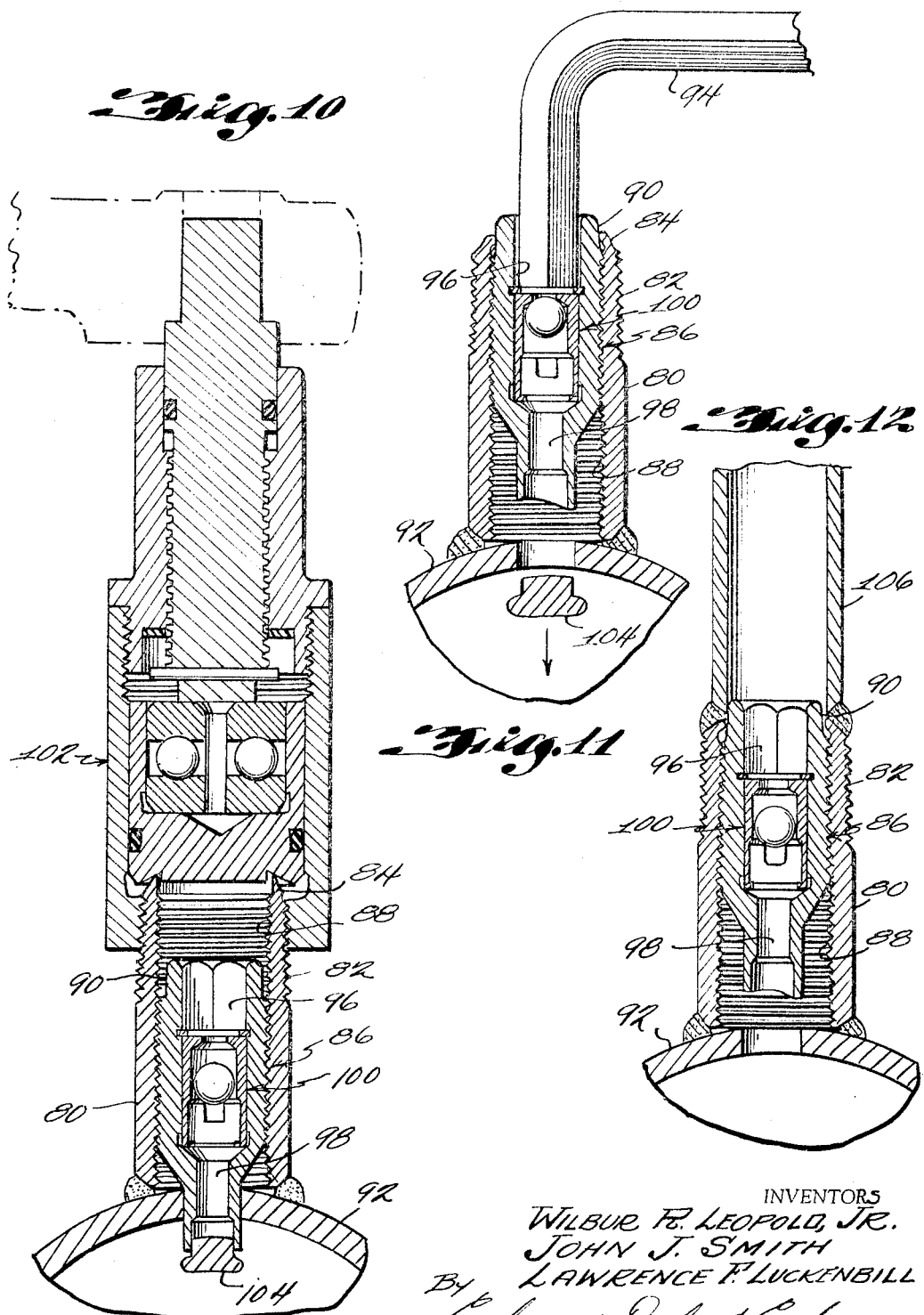

United States Patent Office 3,272,211
Patented Sept. 13, 1966

3,272,211
MAIN AND SERVICE LINE CONNECTION EMBODYING A SELF-TAPPING NIPPLE AND AN EXCESSIVE-FLOW SAFETY VALVE—METHOD AND APPARATUS
Wilbur R. Leopold, Jr., John J. Smith, and Lawrence F. Luckenbill, Decatur, Ill., assignors to Mueller Co., Decatur, Ill., a corporation of Illinois
Filed Sept. 10, 1962, Ser. No. 222,495
9 Claims. (Cl. 137—15)

This invention relates to improvements in methods and apparatus for connecting a service line to a street main without escape of fluid from the main to the atmosphere. More particularly, this invention relates to an improved self-tapping fitting, and method of using the same, for connecting a service line to a main.

Self-tapping fittings for connecting a service line to a main without escape of fluid from the main to the atmosphere are known in the art. In the past, however, all such fittings have been in the form of a service T having a through bore and a lateral outlet with one end of the T, i.e. the inlet end of the bore, being adapted to be adapted to be secured radially to a main and with the outlet being adapted to have a service line connected thereto. In one form of a self-tapping service T, the bore is interiorly threaded and after the T is secured to a main and a service line is connected to the lateral outlet, an exteriorly threaded plug is inserted in the open or other end of the T bore and engaged with the bore threads. The plug carries means on its inner end for perforating the wall of the main by screwing the plug forwardly thereagainst. After the main has been perforated, the plug is retracted sufficiently to allow fluid to flow from the main through the T bore to the lateral outlet and thus establish service while at the same time the plug serves to block the outer end of the T bore and prevent the escape of fluid to the atmosphere. Thereafter the outer end of the T may be provided with a conventional closure cap to form an additional seal.

While self-tapping service T's of this type have proved to be satisfactory for their intended purpose, improvements in self-tapping fittings can be made. For example, a service T is relatively expensive as compared to an interiorly threaded nipple.

Accordingly, it is an object of this invention to provide an improved method and apparatus for connecting a service line to a main without escape of fluid from the main to the atmosphere.

It is another object of this invention to provide an improved and less expensive self-tapping fitting for connecting a service line to a main.

It is a further object of the present invention to provide an improved self-tapping fitting of the type under consideration which embodies an excessive flow safety valve that serves not only to permit connection of a service line to a main without escape of fluid to the atmosphere, but also thereafter to shut off service in the event of excessive flow caused by a fracture, a break or the like, in the service line beyond the valve.

Other objects and advantages of the invention will become apparent from the following description and accompanying drawings, in which:

FIGURE 1 is a fragmentary vertical sectional view showing an interiorly threaded nipple secured to the wall of a main in accordance with this invention;

FIGURE 2 is a view corresponding to FIGURE 1 but illustrating the operation of a perforating tool in conjunction with the nipple to perforate the wall of the main;

FIGURE 3 is a sectional view taken substantially on line 3—3 of FIGURE 2;

FIGURE 4 is a view corresponding to FIGURE 2 but showing the condition of the parts after the wall of the main has been perforated;

FIGURE 5 is a view corresponding to FIGURE 4 showing a service line connected to the outer end of the nipple and the establishment of service;

FIGURE 6 is a fragmentary sectional view showing a modified form of perforating tool;

FIGURE 7 is a fragmentary sectional view showing an alternative arrangement for connecting a service line to the nipple;

FIGURES 8 to 12 are views generally corresponding to FIGURES 1, 2, 4 and 5, but showing a modified form of apparatus and method embodying this invention.

Referring now to the drawings, there is shown in FIGURE 1 a portion of the wall of a street main 20, for example a gas main carrying gas under pressure. In order to connect a service line, leading to a dwelling or the like, to the main 20 in accordance with this invention, one end of a nipple 22 is secured radially and exteriorly to the wall of the main. Such connection preferably will be made by welding, as shown at 24 in the drawing, but can be made by other methods known in the art, for example by the use of a service clamp (not shown). The nipple 22 is provided with interior threads 26, preferably extending from the inner end of the nipple outwardly past the mid point of its length. Outwardly beyond the threads 26 the nipple 22 is provided with a configuration especially adapted to have a service line connected thereto. For example, the outer end of the nipple 22 may be chamfered, as at 28, to facilitate butt welding thereto the correspondingly chamfered end of a service line 30, as shown in FIGURE 5. Additionally, the outer end of the nipple 22 may be interiorly enlarged, as at 32, for the socket welding of a smaller diameter service line 34 therein, as shown in FIGURE 7.

Referring now to FIGURE 2 of the drawings, after the nipple 22 has been welded to the main 20, as shown in FIGURE 1, there is inserted into the outer end of the nipple a perforating tool 36 in the form of an exteriorly threaded plug having a longitudinal coaxial through passageway 38. Inwardly of its threads, the plug 36 is provided with a tapering section 40 which emerges into a reduced cylindrical section 42 having the end edge 44 thereof shaped, as known in the art, to perforate the wall of the main 20 on rotative engagement therewith as the plug is screwed into the nipple and advances against the main. Preferably, the end 44 of the perforating tool 36 is adapted to remove a generally mushroom-shaped slug or coupon 46 from the wall of the main 20, as shown in FIGURE 4, the stem of such slug being received within the end of the reduced cylindrical section 42 and the cap or head of the slug being of a diameter slightly greater than that of the exterior diameter of such section, i.e. slightly larger than the minimum cross-section of the hole made in the main by the perforating tool. For reasons later described, it is desirable that the perforating end of the tool 36 be configured so that the slug 46, after the main 20 has been perforated, will readily drop away from the tool and into the main, as shown in FIGURE 4, without sticking in the end of the cylindrical section 42.

Rearwardly or outwardly of the perforating end of the tool 36, the through passageway 38 is interiorly enlarged to provide a rearwardly facing shoulder 48 against which may be seated the forward end of a sleeve-like member 50 forming the body of an excessive flow safety valve 52, preferably of the type shown in the U.S. patent to Jerman, 2,569,316. The member 50 snugly fits within the passageway 38 and may be retained in place by a snap-ring 54 disposed in an interior circumferential groove in the passageway 38 and engaged with the outer end of the member, as shown in FIGURE 2, or by exterior threads on the member 50 engaged with corresponding threads in the passageway 38, as shown in FIGURE 6.

Adjacent its outer end the member 50 is interiorly reduced to form an inwardly facing valve seat 56 against which a ball valve 58 is adapted to seat. The ball valve 58 is of a diameter only slightly less than the interior diameter of the sleeve member 50 inwardly of the valve seat 56 so as to provide a restriction to flow of fluid past the ball valve from the main through the sleeve member, as later explained. Secured within the inner end of the member 50 is a generally U-shaped permanent magnet 60 having the legs thereof extending toward the valve seat 56 so as to normally attract and hold the ball valve 58 out of engagement with the seat. The magnet 60 is generally flat in transverse section, as shown in FIGURE 3, so as to provide for flow of fluid on opposite sides thereof through the sleeve member 50.

The attractive force of the magnet 60, the weight of the ball valve 58, and the size of the flow restriction between the ball and the interior of the member 50 are so proportioned that the magnet normally retains the ball valve unseated when flow of fluid from the main through the sleeve member does not exceed a predetermined rate, normally slightly in excess of the maximum flow demand of the service line 30 or 34. On the other hand, if the flow exceeds the predetermined rate and thus causes a pressure drop across the ball 58 with a resulting seating force thereon greater than the attractive force of the magnet 60 plus the weight of the ball, the latter will be forced off of the magnet onto the valve seat 56 and thus shut off flow of fluid through the body member 50. The ball valve 58 will remain seated until the seating pressure differential thereacross is reduced sufficiently to allow the magnet 60 plus the weight of the ball valve to unseat the latter.

The outer end portion 62 of the passageway 38 through the perforating tool 36 is of noncircular configuration, e.g. hexagonal, as shown in the drawings, for the reception of a complementary end of a wrench 64 employed to turn the tool to perforate the wall of the main 20. Preferably, the wrench 64 is in the form of a rod having an exterior configuration complementary to the configuration of the outer end portion 62 of the passageway, and also having a longitudinal passageway 66 extending completely therethrough. The outer end of the wrench 64 may be engaged in a complementary socket 68 of a conventional ratchet handle 70 for turning the wrench. The ratchet handle 70 likewise has a longitudinal passageway 72 extending completely therethrough from the bottom of the socket 68 for reasons later described.

After the perforating tool 36 has been inserted in the nipple 22, as described above, the wrench 64 is engaged with the tool and rotated by the ratchet handle 70 to screw the tool forwardly into engagement with and to perforate the wall of the main 20, as shown in FIGURE 4. In the process of perforating the main 20 there is removed from the latter a mushroom-shaped slug 46, as described above, which desirably will drop free from the inner end of the tool 36 down to the bottom of the main and thus allow gas to flow from the main through the respective passageways 38, 66, and 72 in the tool, in the wrench 64 and in the ratchet handle 70. Since such flow will be substantially unimpeded and, thus, excessive, it will immediately act to force the ball valve 58 off the magnet 60 and onto the valve seat 56 to thus shut off flow through the nipple 22. The amount of gas which will escape before the valve 52 is closed will be extremely small and, in fact, unappreciable, so that no danger whatever will exist as a result of escape of such a minute quantity of gas. In this same connection, the tool 36 desirably is screwed into the nipple 22 until the tapered section 40 engages the edges of the hole in the main 20 and makes an effective seal against leakage around the cylindrical section, which leakage could seep past the interengaged threads in the nipple and on the tool.

After the main 20 has been perforated and the excessive flow safety valve 52 closed as aforedescribed, a service line 30 or 34 is connected to the outer end of the nipple, either by a butt weld joint, as shown in FIGURE 5, or, alternatively, by a socket weld joint, as shown in FIGURE 7. The service line is then run to the dwelling (not shown) or other consumption point and all necessary piping therein completed. Thereafter, in order to establish service, i.e. to open the valve 52 in order to allow gas to flow from the main 20 through the nipple 22 and into the service line, the seating pressure differential across the ball valve 58 is reduced until the valve opens. This may be accomplished in two ways.

First of all, the ball valve 58 may not be engaged fluid tight with its seat 56, so that if the service line 30 or 34 and the house piping are tightly closed, the seepage of gas past the ball valve will gradually build up pressure within the service line to a point where the pressure differential across the ball valve is insufficient to maintain the same seated against the attractive force of the magnet 60 and the weight of the ball valve. Whereupon, the ball 58 will drop and be pulled away from its seat 56 by the attractive force of the magnet 60, thus opening the valve 52 and establishing service.

In the event that the ball valve 58 seats tightly and no leakage of gas takes place between the wall of the passageway 38 and the exterior of the sleeve member 50, fluid under pressure, such as compressed air from an appropriate source 74, may be introduced through an appropriate connection 76 into the service line 30 or 34 until the pressure therein is increased to a point where the pressure differential across the ball valve 58 is insufficient to maintain the same seated, as above-described. Whereupon the valve 52 will open and establish service.

By operation of either of the above methods of opening the valve 52, the latter will be reset to shut off flow to the service line in the event of excessive flow through the valve for any reason, usually fracture or a break in the line beyond the valve.

Referring now to FIGURES 8 to 12 of the drawings, there is shown a modified form of apparatus embodying this invention. In this embodiment, the outer end of the nipple 80 is provided with exterior threads 82 and an exteriorly bevelled and interiorly enlarged outer end portion 84. The perforating tool 86 engaged with the interior threads 88 in the nipple 80, is substantially the same as the tool 36 described in conjunction wtih FIGURES 1 to 5 of the drawings, save that the outer end of the tool 86 is provided with an exterior taper 90 for reasons later described. The tool 86 may be rotated to perforate the wall of the main 92 by a simple Allen wrench 94 engaged within a non-circular outer end portion 96 of the passageway 98 through the tool, as shown in FIGURE 9. After the main has been perforated in the same manner as described above with reference to FIGURE 4, the wrench 94 is removed, so that the valve 100 will shut because of excessive flow therethrough. Thereafter, a crimping tool 102, of the type disclosed in the co-pending application of Frank H. Mueller et al., Ser. No. 190,681, now Patent No. 3,130,483 is threaded onto the outer end of the nipple 80, as shown in FIGURE 10, and operated to deform and inwardly crimp the outer end portion 84 of the nipple as shown in FIGURE 11, so that if retraction of the perforating tool 86 is necessary, as later described, it cannot be removed from the nipple 92.

In some instances, after the main has been perforated as described, the mushroom-shaped slug 104, which is removed from the wall of the main in the perforating operation, may stick or jam in the outer end of the perforating tool 86, as shown in FIGURE 10, so as to prevent the flow of gas through the passageway 98 in the tool. As described above, however, the major diameter of the slug 104, i.e. the diameter of the cap portion thereof, normally is of greater diameter than the hole in the main 92. Consequently, if the perforating tool 86 is retracted sufficiently, i.e., by unscrewing the same by means of the wrench 94, the slug 104 will be pulled out of the inner end of the tool and will fall into the main 92, as shown in FIGURE 11, so as to permit gas to flow through the nipple and immediately close the valve 100. Preferably, the perforating tool is completely retracted to the position shown in FIGURE 11 wherein the outer tapered portion 90 will sealingly engage the inwardly crimped portion 84 of the nipple so as to effectively prevent leakage of gas outwardly between the interengaged threads on the tool 86 and in the nipple 80.

Thereafter, a service line 106 can be butt welded to the outer end of the nipple 80, as shown in FIGURE 12, and service thereafter established, either by leakage of gas past the valve 100 or by introducing a pressurized fluid from an outside source into the service line 106 as aforedescribed.

It thus will be seen that the objects of this invention have been fully and effectively accomplished. It will be realized, however, that various changes may be made to the embodiments specifically shown and described to illustrate the principles of this invention without departure from such principles. Additionally, although the invention has been described with special reference to methods and apparatus for connecting a service line to a gas main, it will be realized that the invention is equally applicable for connecting any line to a hollow body containing fluid under pressure. Consequently, the terminology employed in the specification and claims is not to be construed as limiting, but only as illustrative. Accordingly, this invention includes all embodiments encompassed and within the spirit and scope of the following claims having due regard for all equivalents.

What is claimed is:

1. The method of connecting a service line to a main without escape of fluid from the main to the atmosphere, the steps comprising: securing fluid-tight to the wall of the main one end of a nipple; inserting into the other end of the nipple a plug having means on the inner end thereof for perforating the wall of the main by advancement of the plug thereagainst, having a longitudinal through passageway, and having an excessive-flow-safety-valve means controlling the passageway and resettable by reduction of the pressure differential thereacross when closed; advancing the plug into engagement with and perforating the wall of the main to allow fluid under pressure to escape therefrom into the through passageway and close the valve means, while substantially preventing passage of said fluid between the plug and the nipple; retaining the plug within the nipple; connecting a service line fluid-tight to the other end of the T; and reducing the pressure differential across the valve means to open the latter and permit fluid to flow from the main to the line and establish service.

2. The method defined in claim 1 in which the pressure differential is reduced by introducing fluid under pressure from an outside source into the service line.

3. The method defined in claim 1 in which slight leakage of fluid under pressure takes place from the main through the nipple after the valve means is closed, and the pressure differential is reduced by closing the service line fluid-tight and allowing the leakage to build up pressure therein.

4. The method defined in claim 1 in which the perforating means removes a generally mushroom-shaped plug from the wall of the main and including the additional step prior to the connecting step, of retracting the plug from the main to insure removal of the mushroom-shaped plug from the inner end of the passageway.

5. The method defined in claim 4 including the additional step, prior to the retracting step, of radially-inwardly deforming the other end of the nipple to prevent withdrawal of the plug therefrom and wherein the retracting step engages the outer end of the plug with the inwardly deformed portion of the nipple and forms a seal therewith.

6. Apparatus for connecting a service line to a main without escape of appreciable fluid from the main to the atmosphere, comprising: an interiorly-threaded nipple adapted to have one end thereof secured fluid-tight to the wall of a main; an exteriorly threaded plug adapted to engage the nipple threads and having means on the inner end of said plug for perforating the wall of the main on rotative-advancement of said plug thereagainst, said plug having a longitudinal through passageway; and an excessive-flow-safety-valve means carried by said plug, controlling said passageway, and being resettable by reduction of the pressure differential thereacross when closed.

7. The structure defined in claim 6 in which the valve means includes a movable valve member, a seat therefor, and a permanent magnet normally retaining said valve member out of engagement with said seat.

8. The structure defined in claim 6 in which the inner end of the plug has a tapering section merging with a reduced cylindrical section comprising the perforating means.

9. A perforating tool for use with an interiorly-threaded fitting to connect a service line to a main without escape of fluid to the atmosphere, comprising: an exteriorly threaded plug having a longitudinal through passage; means on one end of said plug for perforating the wall of a main on rotative-advancement thereagainst; and an excessive-flow-safety-valve means carried by said plug, controlling said passageway, and resettable by reduction of the pressure differential thereacross when closed.

References Cited by the Examiner

UNITED STATES PATENTS

| | | | |
|---|---|---|---|
| 1,001,324 | 8/1911 | Thompson | 137—460 |
| 1,267,763 | 5/1918 | Grikscheit | 251—284 X |
| 2,569,316 | 9/1951 | Jerman | 137—517 |
| 2,744,809 | 5/1956 | Falligant | 137—318 |
| 2,990,731 | 7/1961 | Merrill | 137—318 X |

FOREIGN PATENTS 37,571 of 1886 Germany.

WILLIAM F. O'DEA, *Primary Examiner.*

ISADOR WEIL, *Examiner.*

R. GERARD, *Assistant Examiner.*